United States Patent
Ahn et al.

(10) Patent No.: US 9,428,601 B2
(45) Date of Patent: Aug. 30, 2016

(54) METHOD OF PREPARING VINYL CHLORIDE POLYMERS HAVING SUPERIOR PROCESSABILITY

(75) Inventors: Seong-Yong Ahn, Jeollabuk-do (KR); Kyung-Hyun Kim, Seoul (KR); Young-Suk Kim, Jeollanam-do (KR); Jong-Hun Cho, Jeollanam-do (KR); Chang-Ryang Jang, Jeollanam-do (KR)

(73) Assignee: LG Chem, Ltd. (KR)

( * ) Notice: Subject to any disclaimer, the term of this patent is extended or adjusted under 35 U.S.C. 154(b) by 1131 days.

(21) Appl. No.: 12/310,425

(22) PCT Filed: Feb. 5, 2007

(86) PCT No.: PCT/KR2007/000599
§ 371 (c)(1),
(2), (4) Date: Jan. 20, 2010

(87) PCT Pub. No.: WO2008/023870
PCT Pub. Date: Feb. 28, 2008

(65) Prior Publication Data
US 2010/0267912 A1    Oct. 21, 2010

(30) Foreign Application Priority Data

Aug. 22, 2006 (KR) .................. 10-2006-0079392
Jan. 11, 2007 (KR) .................. 10-2007-0003430

(51) Int. Cl.
*C08F 14/06* (2006.01)
*C08F 214/06* (2006.01)
*C08F 2/00* (2006.01)
*C08F 114/06* (2006.01)

(52) U.S. Cl.
CPC .............. *C08F 214/06* (2013.01); *C08F 2/001* (2013.01); *C08F 14/06* (2013.01); *C08F 114/06* (2013.01)

(58) Field of Classification Search
USPC .......................... 526/78, 79, 80, 87
See application file for complete search history.

(56) References Cited

U.S. PATENT DOCUMENTS

| 2,345,659 A * | 4/1944 | Downes .................. 526/62 |
| 2,538,051 A * | 1/1951 | Schick .................. 526/200 |
| 4,269,954 A * | 5/1981 | Morningstar et al. ..... 526/62 |
| 4,381,361 A | 4/1983 | Hardt et al. |
| 4,477,638 A * | 10/1984 | Reid .................. 526/84 |
| 4,515,927 A * | 5/1985 | Gaylord .................. 526/87 |
| 5,502,123 A | 3/1996 | Hiyama et al. |
| 5,908,905 A * | 6/1999 | Nakano et al. .......... 526/228 |
| 2006/0149014 A1 * | 7/2006 | Westmijze et al. ...... 526/344 |

FOREIGN PATENT DOCUMENTS

| JP | 59168008 | 9/1984 |
| JP | 10-045813 A | 2/1998 |
| JP | 10-265511 A | 10/1998 |
| WO | 00/31156 A1 | 6/2000 |

OTHER PUBLICATIONS

International Search Report issued on May 18, 2007 in connection with corresponding International Application No. PCT/KR2007/000599.
Product data sheet for Celvol 23/88, Mar. 2006.
DOW Technical handbook for Methocel Cellulose Ethers, Sep. 2002.
U.S. Appl. No. 12/308,294.

* cited by examiner

*Primary Examiner* — Richard A Huhn
(74) *Attorney, Agent, or Firm* — Lerner, David, Littenberg, Krumholz & Mentlik, LLP

(57) ABSTRACT

The present invention relates to a method of preparing a vinyl chloride polymer, and more precisely, a method of preparing a vinyl chloride polymer having excellent processability by raising a final polymerization temperature up to 5~20° C. from an first polymerization temperature.

17 Claims, No Drawings

METHOD OF PREPARING VINYL CHLORIDE POLYMERS HAVING SUPERIOR PROCESSABILITY

TECHNICAL FIELD

The present invention relates to a method of preparing a vinyl chloride polymer, and more precisely, a method of preparing a vinyl chloride polymer having excellent processability by raising the final polymerization temperature up to 5~20° C. from the initial polymerization temperature.

BACKGROUND ART

A vinyl chloride polymer has been widely used in various industrial fields including the production of pipe and construction materials owing to its excellent mechanical strength, weatherability and chemical resistance. However, its moldability is not very good and needs to be improved. In general, the moldability of a vinyl chloride polymer depends on the polymer particle characteristics. Therefore, in order to increase productivity, the bulk specific gravity, internal porosity, diameter and particle distribution of vinyl chloride polymer particles need to be controlled, along with the improvement of gelation characteristics, plasticizer absorptiveness and powder fluidity. In particular, the bulk specific gravity of the vinyl chloride polymer must increase to improve the productivity from extrusion molding, and the melting rate of gelation of the vinyl chloride polymer must be accelerated to improve the processability of extrusion molding. However, when extrudate produced from extrusion molding is increased, the melting torque is increased. But, melting torque needs to be low for gelation of the vinyl chloride polymer. The conventional suspension polymerization produces vinyl chloride having either excellent bulk specific gravity or excellent gelation properties, which is not satisfactory for extrusion molding.

As an alternative to improve the processability of a vinyl chloride polymer molding, it has been proposed that 0.01~0.2 weight part of one or more partially saponificated polyvinyl alcohols having 65 mol % hydration and an average degree of polymerization of 500~4000 is added to 100 weight part of vinyl chloride monomer as a dispersion stabilizer for polymerization, followed by suspension polymerization, and then the reaction mixture is cooled down in a reflux condenser when the conversion rate of the vinyl chloride monomer reaches 3~40%, during which a polyvinyl alcohol having at least 97 mol % hydration and an average degree of polymerization of at least 1500 is additionally added (JP 1998-045813). However, the resultant vinyl chloride polymer of this proposed method has the problem of decreased melting properties because of the addition of a dispersion stabilizer having 90 mol % hydration, even though the bulk specific gravity of the vinyl chloride polymer can be increased by this method.

DISCLOSURE OF INVENTION

Technical Problem

It is an object of the present invention to provide a method of preparing a vinyl chloride polymer having increased bulk specific gravity, excellent processability and early coloring properties, and improved productivity.

Technical Solution

The above and other objects of the present invention can be achieved by the following embodiments of the present invention.

To achieve the above objects, the present invention provides a method of preparing a vinyl chloride polymer comprising the following steps: adding a solvent, a polymerization initiator, a protective colloid auxiliary, a pH regulator and vinyl chloride monomer to a reactor; first polymerizing by maintaining the temperature of the reactor at 30~80° C.; and second polymerizing by raising the temperature up to 5~20° C. from the first polymerization temperature when the polymerization conversion rate reaches 60% or over, and adding an antioxidant.

Hereinafter, the present invention is described in detail.

To a reactor were added, 120~150 weight part of a solvent, 0.03~5 weight part of a protective colloid auxiliary, 0.02~0.2 weight part of an organic peroxide or a sulfate based polymerization initiator, and 0.01~1.5 weight part of a pH regulator for 100 weight part of vinyl chloride monomer (or a mixture with comonomer that is suitable for co-polymerization with vinyl chloride monomer).

A vinyl chloride polymer includes not only a resin composed of vinyl chloride monomer alone but also a monomer mixture which contains vinyl chloride monomer as a major component and another vinyl monomer possibly copolymerized with the vinyl chloride monomer (the content of vinyl chloride monomer in the entire polymer is at least 50 weight %). The vinyl monomer that is possibly copolymerized with the vinyl chloride monomer is exemplified by olefin compounds such as ethylene and propylene; vinyl alkyl esters such as vinyl acetate and vinyl propionate; unsaturated nitriles such as acrylonitrile; vinyl alkyl ethers such as vinyl methyl ether and vinyl ethyl ether; unsaturated fatty acids such as acrylic acid, methacrylic acid, itaconic acid and maleic acid; and anhydrides of such fatty acids, and one or more compounds selected from the above.

The preferable content of vinyl monomer for the copolymerization with vinyl chloride monomer is 1~99 weight part for 100 weight part of the vinyl chloride monomer.

A protective colloid auxiliary can be added to ensure the vinyl chloride polymer production processes remain stable and to give regular particles, which might include a vinyl alcohol resin having 30~90 weight % hydrolysis, 4% solution viscosity of 10~60 cps at room temperature, a hydroxypropyl cellulose having a hydropropyl group of 3~20 weight %, 2% solution viscosity of 10~20,000 cps at room precisely, one or more compounds selected from a group consisting of acrylic acid polymer, methacrylic acid polymer, itaconic acid polymer, fumaric acid polymer, maleic acid polymer, succinic acid polymer, or gelatin can be used. The preferable content of the protective colloid auxiliary is 0.03~5 weight part for 100 weight part of the total monomer and 0.05~2.5 weight part is more preferred.

As a polymerization initiator herein, one or more compounds selected from a group consisting of diacylperoxides such as dicumyl peroxide, dipentyl peroxide, di-3,5,5-trimethyl hexanoyl peroxide and dilauryl peroxide; peroxydicarbonates such as diisopropylperoxydicarbonate, di-sec-butylperoxydicarbonate and di-2-ethylhexylperoxydicarbonate; peroxyesters such as t-butylperoxypivalate and t-butylperoxyneodecanoate; azo compounds such as azobis-2,4-dimethylvaleronitrile; and sulfates such as potassium persulfate and ammonium persulfate can be used. The content of each compound is determined by considering the production process, productivity and quality of the final product, etc. But in general, the total initiator content is 0.02~0.2 weight part for 100 weight part of the total monomer and more preferably 0.04~0.12 weight part. If the initiator content is lower than the above range, the reaction time will be retarded and thus productivity will be decreased.

On the contrary, if the initiator content is higher than the above range, the initiator will not be completely consumed during the polymerization and will remain in a final resin product, thus reducing the thermostability and qualities of the product including color expression.

The pH regulator herein is exemplified by $NaHCO_3$, $Na_2B_4O_7$, $Na_2HPO_4$, $Na_2CO_3$, $KH_2PO_4$, $NH_4OH$, $KHC_4H_4O_6$, $KHC_8H_4O_4$ or $Ca(OH)_2$, and these compounds can be used singly or as a mixture of at least two.

The shape of a stirring apparatus, for example a stirrer and a baffle, is not limited and any general stirring apparatus used for the conventional suspension polymerization of vinyl chloride monomer can be used. For example, paddle type, pitched paddle type, bloomers gin type, power feeder type, turbine type and propeller type can be used as a stirring blade or several stirring blades can be used together. As a baffle, board type, cylinder type, D type, loop type and finger type baffles can be used.

To a reactor are added a protective colloid auxiliary, a polymerization initiator, a pH regulator and deionized water as a solvent, to which vinyl chloride monomer is added under vacuum conditions, followed by polymerization. At this time, the polymerization can be performed by suspension polymerization.

First polymerization is performed at 30~80° C. until the polymerization conversion rate reaches 60%. When the polymerization conversion rate reaches 60%, the temperature of the reactor is raised up to 5~20° C. from the first polymerization temperature and then an antioxidant is added, followed by second polymerization at a constant temperature. If the temperature is raised before the conversion rate reaches 60%, the molecular weight distribution will become wider and thus gelation will be interrupted in an extruder, resulting in the decrease of processability.

The degree of polymerization of a vinyl chloride polymer is determined by the polymerization temperature. Therefore, if the polymerization temperature is high, a resultant resin will have a low degree of polymerization. On the other hand, if the polymerization temperature is low, a resin with a high degree of polymerization will be prepared. The polymerization temperature of the present invention gives a degree of polymerization of 700~1300.

As explained hereinbefore, according to the present invention, the polymerization temperature is not constant from first polymerization to second polymerization. By raising the reaction temperature in the second polymerization stage, highly polymerized region content is regulated, resulting in a vinyl chloride polymer having excellent processability and a large apparent specific gravity. The slurry obtained from the polymerization is dried with a fluidized-bed dryer to give a final vinyl chloride polymer.

An antioxidant is added during second polymerization at 0.001~0.03 weight part for 100 weight part of the total monomer. If an antioxidant is added within the above content range, the coloring properties will be excellent. An antioxidant herein is not limited to a specific one and any antioxidant generally used for vinyl chloride polymerization can be used, which is exemplified by phenol compounds such as triethylene glycol-bis-[3-(3-t-butyl-methyl-4-hydroxy phenyl)propionate], hydroquinone, p-methoxy phenol, t-butylhydroxyanisole, n-octadecyl-3-(4-hydroxy 3,5-di-t-butyl phenyl) propionate, 2,5-di-t-butyl hydroquinone, 4,4-butylidenebis (3-methyl-6-t-butyl phenol), t-butyl catechol, 4,4-thio bis(6-t-butyl-m-cresole), tocopherol and non dihydro guaretic acid; amine compounds such as N,N-diphenyl-p-phenylene diamine and 4,4-bis(dimethyl benzyl)diphenyl amine; and sulfur compounds such as dodecyl mercaptan and 1,3-diphenyl-2-thiol.

In the present invention, when the polymerization conversion rate reaches 30~40% during first polymerization, vinyl chloride monomer is additionally added, and when the polymerization conversion rate reaches 60~70% during second polymerization, vinyl chloride monomer is additionally added again to increase the bulk specific gravity and polymerization productivity.

Vinyl chloride monomer is added continuously during the period when the polymerization conversion rate reaches 30~40% and 60~70%.

The addition of vinyl chloride monomer when the polymerization conversion rate reaches 30~40% is attributed to the expectation that unity/redispersion occurs most actively during that period so that the added vinyl chloride monomer can be converted into a stable vinyl chloride polymer with increased polymerization productivity per batch.

When the polymerization conversion rate reaches 60~70%, which means the porous formation inside the polymer is satisfactory, it is possible to regulate the internal morphology of the polymer particle. The addition of vinyl chloride polymer at this time results in a vinyl chloride polymer having a high bulk specific gravity owing to the polymer particles being filled in by monomer diffusion.

The content of vinyl chloride monomer when the polymerization conversion rate is 30~40% is preferably 10~30 weight part for 100 weight part of the vinyl chloride monomer added before polymerization starts, and the content of vinyl chloride monomer added when the polymerization conversion rate is 60~70% is preferably 10~30 weight part.

If the content of vinyl chloride monomer added when the polymerization conversion rate reaches 30~40% and 60~70% is less than 10 weight part, the polymerization productivity will not be increased enough, while if the content of vinyl chloride monomer is more than 30 weight part, the polymerization stability will be at risk because the monomer exceeds the effective volume of the reactor.

In the present invention, an additive such as a polymerization regulator, a chain transfer agent, a pH regulator, a cross-linking agent, an antistatic agent, a scale inhibitor, and a surfactant can be added separately or continuously to the polymerization system before or after polymerization, or during the polymerization.

BEST MODE FOR CARRYING OUT THE INVENTION

Practical and presently preferred embodiments of the present invention are illustrated as shown in the following examples.

However, it will be appreciated that those skilled in the art, on consideration of this disclosure, may make modifications and improvements within the spirit and scope of the present invention.

Example 1

To a 1 $m^3$ reactor equipped with a reflux condenser was added 390 kg of deionized water, 130 g of di-2-ethylhexylperoxydicarbonate, 20 g of dilaurylperoxide, 200 g of polyvinyl alcohol having 80% hydration and a 4% solution viscosity of 30 cps at room temperature, and 10 g of sodiumbicarbonate, which was made vacuous. Then, 300 kg of vinyl chloride monomer was added and the first polymerization temperature was raised to 55° C., followed by reaction for 3 hours. The reaction temperature was raised to 64° C., and 60 g of triethylene glycol-bis-[3-(3-t-butyl-methyl-4-hydroxy phenyl) propionate] was added, followed by reaction. The obtained slurry was dried with a fluidized-bed dryer to give a vinyl chloride polymer.

Example 2

Polymerization was performed in the same manner as described in Example 1, except that the primary reaction temperature was raised to 55° C., followed by reaction for 3 hours, and then the polymerization temperature was raised to 62° C., at which time an antioxidant was added.

Example 3

Polymerization was performed in the same manner as described in Example 1, except that the primary reaction temperature was raised to 55° C., followed by reaction for 3 hours, and then the polymerization temperature was raised to 60° C., at which time an antioxidant was added.

Example 4

Polymerization was performed in the same manner as described in Example 1, except that the primary reaction temperature was raised to 55° C., followed by reaction for 3 hours, and then the polymerization temperature was raised to 68° C., at which time an antioxidant was added.

Example 5

Polymerization was performed in the same manner as described in Example 1, except that the primary reaction temperature was raised to 52° C., followed by reaction for 4 hours, and then the polymerization temperature was raised to 64° C., at which time an antioxidant was added.

Example 6

Polymerization was performed in the same manner as described in Example 1, except that the primary reaction temperature was raised to 52° C., followed by reaction for 4 hours, and then the polymerization temperature was raised to 60° C., at which time an antioxidant was added.

Example 7

Polymerization was performed in the same manner as described in Example 1, except that 60 kg of vinyl chloride monomer was additionally added to the reactor when the polymerization conversion rate reached 30% and 60%.

Example 8

Polymerization was performed in the same manner as described in Example 1, except that 60 kg of vinyl chloride monomer was additionally added to the reactor when the polymerization conversion rate reached 30% and 65%.

Example 9

Polymerization was performed in the same manner as described in Example 1, except that 60 kg of vinyl chloride monomer was additionally added to the reactor when the polymerization conversion rate reached 30% and 70%.

Example 10

Polymerization was performed in the same manner as described in Example 1, except that 60 kg of vinyl chloride monomer was additionally added to the reactor when the polymerization conversion rate reached 35% and 60%.

Example 11

Polymerization was performed in the same manner as described in Example 1, except that 60 kg of vinyl chloride monomer was additionally added to the reactor when the polymerization conversion rate reached 35% and 65%.

Example 12

Polymerization was performed in the same manner as described in Example 1, except that 60 kg of vinyl chloride monomer was additionally added to the reactor when the polymerization conversion rate reached 35% and 70%.

Example 13

Polymerization was performed in the same manner as described in Example 1, except that 60 kg of vinyl chloride monomer was additionally added to the reactor when the polymerization conversion rate reached 40% and 60%.

Example 14

Polymerization was performed in the same manner as described in Example 1, except that 60 kg of vinyl chloride monomer was additionally added to the reactor when the polymerization conversion rate reached 40% and 65%.

Example 15

Polymerization was performed in the same manner as described in Example 1, except that 60 kg of vinyl chloride monomer was additionally added to the reactor when the polymerization conversion rate reached 40% and 70%.

Comparative Example 1

Polymerization was performed in the same manner as described in Example 1, except that the first polymerization temperature was raised to 57° C., and the reaction temperature was maintained during the entire polymerization process, and an antioxidant was added when the pressure of the reactor was 6.0 kg/cm$^2$.

Comparative Example 2

Polymerization was performed in the same manner as described in Example 1, except that 15 kg of vinyl chloride monomer was additionally added to the reactor when the polymerization conversion rate reached 35% and 65%.

Comparative Example 3

Polymerization was performed in the same manner as described in Example 1, except that 60 kg of vinyl chloride monomer was added only when the polymerization conversion rate reached 75%.

Comparative Example 4

Polymerization was performed in the same manner as described in Example 1, except that 60 kg of vinyl chloride monomer was added only when the polymerization conversion rate reached 35%.

Comparative Example 5

Polymerization was performed in the same manner as described in Example 1, except that 60 kg of vinyl chloride monomer was added only when the polymerization conversion rate reached 65%.

Comparative Example 6

Polymerization was performed in the same manner as described in Example 1, except that 60 kg of vinyl chloride monomer was added only when the polymerization conversion rate reached 45%.

The results of the above examples and comparative examples are shown in Table 1~Table 3.

The values shown in Table 1~Table 3 were measured as follows.

Apparent Specific Gravity

Measured by JIS K-6721.

Coloring Characteristics

To 100 weight part of the obtained polymer were added 1 weight part of a Sn-based stabilizer, 0.5 weight part of a Pb-based stabilizer, 1.5 weight part of a stabilizer, and 45 weight part of a plasticizer, followed by mixing for 5 minutes at 150° C. using a roll to give a sheet. The obtained sheet was cut and folded, followed by press molding to give a pressed sheet. The sheet was observed by the naked eye and evaluated by the below standard.

◎: considering Comparative Example 1 as a standard, this level indicates the similar or equal coloring to the Comparative Example 1 and no problems in practical use.

○: considering Comparative Example 1 as a standard, this level indicates lower coloring but no problems in practical use.

X: considering Comparative Example 1 as a standard, this level indicates poor coloring and has a problem in practical use.

Thermostability

The roll sheet prepared to measure the primary coloring characteristics was cut into 250 mm×20 mm and put in a 190° C. master oven. The sheet proceeded by 3 mm/min and the time consumed until the color changed to black was measured; this time was set up as a standard for the evaluation of thermostability.

Fusion Time

To 100 weight part of a vinyl chloride polymer were added 3 weight part of basic lead lactate and 1 weight part of stearate. 60 g of the mixture was put in a mixer made by Brabender, the temperature of the chamber was set at 185° C., and the roller was set at 60 rpm. The time to reach maximum torque was measured.

TABLE 1

| List | Unit | Example 1 | Example 2 | Example 3 | Example 4 | Example 5 | Example 6 |
|---|---|---|---|---|---|---|---|
| Polymerization time | min | 300 | 305 | 310 | 330 | 315 | 310 |
| Bulk specific gravity | g/cc | 0.562 | 0.553 | 0.535 | 0.566 | 0.551 | 0.532 |
| Polymerization degree | | 1020 | 1030 | 1040 | 1000 | 1030 | 1040 |
| Mean diameter | μm | 162 | 160 | 161 | 159 | 162 | 164 |
| Thermostability | min | 62 | 61 | 60 | 58 | 59 | 58 |
| Coloring | | ◎ | 502 | ◎ | ○ | ◎ | ○ |
| Fusion time | sec | 104 | 109 | 111 | 103 | 108 | 110 |
| Fusion torque | Nm | 37.6 | 37.8 | 37.6 | 37.5 | 37.8 | 37.9 |
| Extrusion amount | g/min | 41 | 40 | 37.5 | 41 | 40 | 37.5 |

TABLE 2

| List | Unit | Example 7 | Example 8 | Example 9 | Example 10 | Example 11 |
|---|---|---|---|---|---|---|
| Polymerization time | min | 320 | 323 | 324 | 321 | 325 |
| Polymerization production | Kg | 316 | 314 | 312 | 314 | 313 |
| Polymerization productivity | Kg/day | 1422 | 1400 | 1387 | 1409 | 1387 |
| | Kg/year | 519030 | 510955 | 506133 | 514138 | 506193 |
| | MT/year | 519 | 511 | 506 | 514 | 506 |
| Bulk specific gravity | g/cc | 0.576 | 0.578 | 0.579 | 0.575 | 0.576 |
| Polymerization degree | | 1020 | 1020 | 1020 | 1020 | 1020 |
| Mean diameter | μm | 165 | 164 | 165 | 164 | 162 |
| Thermostability | min | 63 | 62 | 61 | 62 | 61 |
| Coloring properties | | ◎ | ◎ | ◎ | ◎ | ◎ |

TABLE 2-continued

| List | Unit | | | | | |
|---|---|---|---|---|---|---|
| Fusion time | sec | 105 | 107 | 106 | 106 | 103 |
| Fusion torque | Nm | 37.6 | 37.6 | 37.8 | 37.6 | 37.5 |
| Extrusion amount | g/min | 42 | 41.2 | 40.7 | 41.9 | 40.5 |

| List | Unit | Example 12 | Example 13 | Example 14 | Example 15 | Average |
|---|---|---|---|---|---|---|
| Polymerization time | min | 327 | 322 | 326 | 328 | 324 |
| Polymerization production | Kg | 310 | 313 | 310 | 307 | 312 |
| Polymerization productivity | Kg/day | 1365 | 1400 | 1369 | 1348 | 1366 |
| | Kg/year | 498275 | 510909 | 499804 | 491949 | 506376 |
| | MT/year | 498 | 511 | 500 | 492 | 506 |
| Bulk specific gravity | g/cc | 0.577 | 0.573 | 0.574 | 0.576 | 0.576 |
| Polymerization degree | | 1020 | 1020 | 1020 | 1020 | 1020 |
| Mean diameter | μm | 164 | 163 | 164 | 164 | 164 |
| Thermostability | min | 61 | 62 | 61 | 60 | 61 |
| Coloring properties | | ⊚ | ⊚ | ⊚ | ⊚ | ⊚ |
| Fusion time | sec | 104 | 105 | 107 | 104 | 105 |
| Fusion torque | Nm | 37.6 | 37.7 | 37.7 | 37.9 | 37.7 |
| Extrusion amount | g/min | 40.6 | 40.8 | 40.9 | 41.0 | 41.1 |

TABLE 3

| List | Unit | Comparative Example1 | Comparative Example2 | Comparative Example 3 | Comparative Example4 | Comparative Example5 | Comparative Example6 |
|---|---|---|---|---|---|---|---|
| Polymerization time | min | 300 | 310 | 335 | 310 | 315 | 310 |
| Polymerization production | Kg | 255 | 269 | 267 | 298 | 274 | 284 |
| Polymerization productivity | kg/day | 1224 | 1250 | 1148 | 1384 | 1253 | 1319 |
| | kg/year | 446760 | 456085 | 418911 | 505254 | 457189 | 481517 |
| | MT/year | 447 | 456 | 419 | 505 | 457 | 482 |
| Bulk specific gravity | g/cc | 0.524 | 0.535 | 0.528 | 0.532 | 0.553 | 0.540 |
| Polymerization degree | | 1020 | 1020 | 1020 | 1020 | 1020 | 1020 |
| Mean diameter | min | 161 | 163 | 165 | 164 | 165 | 165 |
| Thermostability | min | 60 | 61 | 55 | 60 | 58 | 58 |
| Coloring properties | | ⊚ | ⊚ | X | ⊚ | ○ | ○ |
| Fusion time | Sec | 115 | 102 | 104 | 110 | 108 | 111 |
| Fusion torque | Nm | 38.1 | 37.5 | 38.0 | 37.8 | 37.6 | 37.7 |
| Extrusion amount | g/min | 37 | 38 | 37 | 37.5 | 40 | 39 |

As shown in Table 1~Table 3, the vinyl chloride polymers of Example 1~Example 6 exhibited excellent apparent specific gravity, and satisfactory fusion time and extrusion amount, compared with the polymer of Comparative Example 1.

The polymers of Example 7~Example 15, in which vinyl chloride monomers were additionally added in portions after a certain period of time, exhibited excellent polymerization production per unit time, compared with the polymers of Comparative Examples 1~6.

INDUSTRIAL APPLICABILITY

According to the method of the present invention, a vinyl chloride polymer having a high bulk specific gravity and excellent processability along with excellent primary coloring properties and high qualities can be prepared, and further, polymerization productivity can be increased by the addition of additional vinyl chloride monomers separately.

Those skilled in the art will appreciate that the conceptions and specific embodiments disclosed in the foregoing description may be readily utilized as a basis for modifying or designing other embodiments for carrying out the same purposes of the present invention. Those skilled in the art will also appreciate that such equivalent embodiments do not depart from the spirit and scope of the present invention as set forth in the appended claims.

The invention claimed is:

1. A method of preparing a vinyl chloride homopolymer comprising:
polymerizing vinyl chloride monomer in the presence of a solvent, a polymerization initiator, a protective colloid auxiliary, and a pH regulator at a polymerization temperature of 30° C. to 75° C.,
wherein 120 to 150 weight part of the solvent, 0.02 to 0.2 weight part of the polymerization initiator, 0.03 to 5 weight part of the protective colloid auxiliary and 0.01 to 1.5 weight part of the pH regulator are added to 100 weight part of the vinyl chloride monomer;
adding a first amount of additional vinyl chloride monomer when a polymerization conversion rate ranges from 30% to 40% at the polymerization temperature;
polymerizing the first additional vinyl chloride monomer at the polymerization temperature;
adding a second amount of additional vinyl chloride monomer and an antioxidant to the reactor when the polymerization conversion rate reaches 60 to 70%; and
polymerizing the second amount of additional vinyl chloride monomer at a temperature that is 5° C. to 20° C. higher than the polymerization temperature to obtain an average polymerization degree of 700 to 1300;
wherein the antioxidant is added in an amount of 0.001 to 0.03 weight part for 100 weight part of the vinyl chloride monomer, and
wherein the polymerization initiator is one or more compounds selected from the group consisting of dicumyl peroxide, dilauryl peroxide, di-2-ethylhexylperoxydicarbonate and t-butylperoxyneodecanoate.

2. The method of preparing a vinyl chloride homopolymer according to claim 1, wherein the protective colloid auxiliary is a vinyl alcohol resin having 30 to 90 weight % hydrolysis, and a 4% solution viscosity of 10 to 60 cps at room temperature; or a hydroxypropyl cellulose having a hydropropyl group of 3 to 20 weight %, and a 2% solution viscosity of 10 to 20,000 cps at room temperature.

3. The method of preparing a vinyl chloride homopolymer according to claim 1, wherein the pH regulator is selected from a group consisting of $NaHCO_3$, $Na_2B_4O_7$, $Na_2HPO_4$, $Na_2CO_3$, $KH_2PO_4$, $NH_4OH$, $KHC_4H_4O_6$, $KHC_8H_4O_4$ and $Ca(OH)_2$.

4. The method of preparing a vinyl chloride homopolymer according to claim 1, wherein the antioxidant is one or more compounds selected from a group consisting of triethylene glycol-bis-[3-(3-t-butyl-methyl-4-hydroxy phenyl)propionate], hydroquinone, p-methoxy phenol, t-butylhydroxyanisole, n-octadecyl-3-(4-hydroxy 3,5-di-t-butyl phenyl) propionate, 2,5-di-t-butyl hydroquinone, 4,4'-butylidenebis (3-methyl-6-t-butyl phenol), t-butyl catechol, 4,4'-thio bis (6-t-butyl-m-cresol), and tocopherol.

5. The method of preparing a vinyl chloride homopolymer according to claim 1, wherein the antioxidant is N,N'-diphenyl-p-phenylene diamine or 4,4'-bis(dimethyl benzyl) diphenyl amine.

6. The method of preparing a vinyl chloride homopolymer according to claim 1, wherein the antioxidant is dodecyl mercaptan.

7. The method of preparing a vinyl chloride homopolymer according to claim 1, wherein the amount of the vinyl chloride monomer added when the polymerization conversion rate is 30% to 40% is 10 to 30 weight part for 100 weight part of the vinyl chloride monomer added before polymerization starts, and the amount of vinyl chloride monomer added when the polymerization conversion rate is 60% to 70% is 10 to 30 weight part for 100 weight part of the vinyl chloride monomer added before polymerization starts.

8. The method of claim 1, wherein a bulk specific gravity of the vinyl chloride homopolymer ranges from 0.573 grams per cubic centimeter (g/cc) to 0.579 g/cc.

9. A method of preparing a vinyl chloride polymer comprising:
polymerizing vinyl chloride monomer in the presence of a solvent, a polymerization initiator, a protective colloid auxiliary, and a pH regulator at a polymerization temperature of 30° C. to 75° C.,
wherein 120 to 150 weight part of the solvent, 0.02 to 0.2 weight part of the polymerization initiator, 0.03 to 5 weight part of the protective colloid auxiliary and 0.01 to 1.5 weight part of the pH regulator are added to 100 weight part of the vinyl chloride monomer;
adding a first amount of additional vinyl chloride monomer when a polymerization conversion rate ranges from 30% to 40% at the polymerization temperature;
polymerizing the first additional vinyl chloride monomer at the polymerization temperature;
adding a second amount of additional vinyl chloride monomer and an antioxidant to the reactor when the polymerization conversion rate reaches 60 to 70%; and
polymerizing the second amount of additional vinyl chloride monomer at a temperature that is 5° C. to 20° C. higher than the polymerization temperature to obtain an average polymerization degree of 700 to 1300;
wherein the antioxidant is added in an amount of 0.001 to 0.03 weight part for 100 weight part of the vinyl chloride monomer, and
wherein the polymerization initiator is one or more compounds selected from the group consisting of dicumyl peroxide, dilauryl peroxide, di-2-ethylhexylperoxydicarbonate and t-butylperoxyneodecanoate,
wherein a bulk specific gravity of the vinyl chloride polymer ranges from 0.573 grams per cubic centimeter (g/cc) to 0.579 g/cc.

10. The method of preparing a vinyl chloride polymer according to claim 9, wherein a vinyl monomer that is copolymerizable with the vinyl chloride monomer is additionally added to the reactor at 1 to 99 weight part for 100 weight part of the vinyl chloride monomer.

11. The method of preparing a vinyl chloride polymer according to claim 10, wherein the vinyl monomer that is copolymerizable with the vinyl chloride monomer is one or more compounds selected from a group consisting of olefins, vinyl acetates, vinyl esters, unsaturated nitriles, vinyl alkyl ethers and unsaturated fatty acids.

12. The method of preparing vinyl chloride polymer according to claim 9, wherein the protective colloid auxiliary is a vinyl alcohol resin having 30 to 90 weight % hydrolysis, and a 4% solution viscosity of 10 to 60 cps at room temperature; or a hydroxypropyl cellulose having a hydropropyl group of 3 to 20 weight %, and a 2% solution viscosity of 10 to 20,000 cps at room temperature.

13. The method of preparing a vinyl chloride polymer according to claim 9, wherein the pH regulator is selected from a group consisting of $NaHCO_3$, $Na_2B_4O_7$, $Na_2HPO_4$, $Na_2CO_3$, $KH_2PO_4$, $NH_4OH$, $KHC_4H_4O_6$, $KHC_8H_4O_4$ and $Ca(OH)_2$.

14. The method of preparing a vinyl chloride polymer according to claim 9, wherein the antioxidant is one or more compounds selected from a group consisting of triethylene glycol-bis-[3-(3-t-butyl-methyl-4-hydroxy phenyl)propionate], hydroquinone, p-methoxy phenol, t-butylhydroxyanisole, n-octadecyl-3-(4-hydroxy 3,5-di-t-butyl phenyl) propionate, 2,5-di-t-butyl hydroquinone, 4,4'-butylidenebis (3-methyl-6-t-butyl phenol), t-butyl catechol, 4,4'-thio bis (6-t-butyl-m-cresol), and tocopherol.

15. The method of preparing a vinyl chloride polymer according to claim 9, wherein the antioxidant is N,N'-diphenyl-p-phenylene diamine or 4,4'-bis(dimethyl benzyl) diphenyl amine.

16. The method of preparing a vinyl chloride polymer according to claim 9, wherein the antioxidant is dodecyl mercaptan.

17. The method of preparing a vinyl chloride polymer according to claim 9, wherein the amount of the vinyl chloride monomer added when the polymerization conversion rate is 30% to 40% is 10 to 30 weight part for 100 weight part of the vinyl chloride monomer added before polymerization starts, and the amount of vinyl chloride monomer added when the polymerization conversion rate is 60% to 70% is 10 to 30 weight part for 100 weight part of the vinyl chloride monomer added before polymerization starts.

* * * * *